United States Patent
Reed et al.

(10) Patent No.: US 10,671,708 B2
(45) Date of Patent: *Jun. 2, 2020

(54) PERIODICITY DETECTION OF NETWORK TRAFFIC

(71) Applicant: Microsoft Technology Licensing, LLC, Redmond, WA (US)

(72) Inventors: Kyle Allan Reed, Bothell, WA (US); Matthew Michael Swann, Bothell, WA (US); Edward Chris Thayer, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,830

(22) Filed: Feb. 11, 2019

(65) Prior Publication Data
US 2019/0243947 A1 Aug. 8, 2019

Related U.S. Application Data

(63) Continuation of application No. 15/265,670, filed on Sep. 14, 2016, now Pat. No. 10,204,214.

(51) Int. Cl.
*G06F 21/00* (2013.01)
*G06F 21/56* (2013.01)
*H04L 29/06* (2006.01)
*H04L 29/08* (2006.01)

(52) U.S. Cl.
CPC ............ *G06F 21/00* (2013.01); *G06F 21/561* (2013.01); *H04L 63/1425* (2013.01); *G06F 2221/2101* (2013.01); *G06F 2221/2151* (2013.01); *H04L 67/22* (2013.01)

(58) Field of Classification Search
CPC ....................................................... G06F 21/00
See application file for complete search history.

(56) References Cited

U.S. PATENT DOCUMENTS

| | | | |
|---|---|---|---|
| 8,806,635 B2 * | 8/2014 | Bennett | H04L 63/1416 726/23 |
| 9,350,669 B2 * | 5/2016 | Yamada | H04L 47/127 |

* cited by examiner

*Primary Examiner* — Jeffrey Nickerson
*Assistant Examiner* — Thanh H Le
(74) *Attorney, Agent, or Firm* — Newport IP, LLC; Han Gim

(57) ABSTRACT

The improved detection of malicious processes executing on a networked computing device is provided. An agent running on the networked computing device monitors the communications transmitted to devices outside of the network to determine whether the process is likely using a periodic beacon signal to communicate with an external control center associated with a potentially malicious party. The agent maintains a dictionary data structure of objects, identifiable by the process identifier and the remote device's address, to track a given process/destination group's communication history. The communication history is updated when new messages are identified for periodic patterns to be identified for the messages, which may be used to identify a process as potentially malicious.

20 Claims, 6 Drawing Sheets

PERIODICITY DETECTION OF NETWORK TRAFFIC

CROSS REFERENCE TO RELATED APPLICATIONS

This application is a continuation of U.S. patent application Ser. No. 15/265,670, filed Sep. 14, 2016, and now assigned U.S. Pat. No. 10,204,214, the disclosure of which is incorporated by reference herein in its entirety.

BACKGROUND

In a network of computing devices, various programs may run and communicate with each other within the network and with machines outside of the network. Some of the applications running within the network may have been covertly installed to perform actions on or with the devices within the network without the legitimate users' approval. These malicious applications take up unwanted space in computer memory, consume bandwidth and processing resources, and can potentially expose the legitimate users' data or otherwise harm the functionality of the network. Finding and removing these malicious applications can be incredibly challenging however, as they are designed to avoid detection, and often mask their communications with the malicious party controlling them.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

The systems and methods described herein provide for periodicity detection to identify malicious applications. Periodicity detection requires less memory space to store, less bandwidth to collect, and is faster and more accurate in producing results than an event logging system. In an event logging system, various actions taken by parties are recorded in an event log and may be determined to be anomalous, and therefore potentially the result of a malicious application. However, many malicious actions use events that are not logged in the event log to avoid detection when negatively affecting the network. Alternatively or additionally, many malicious actions may disguise themselves as legitimate actions to avoid being classified as an anomaly. To detect these hidden malicious applications, the present disclosure describes periodicity detection to identify the beacon signals used to request the Command & Control signals from the controller or to deliver information to the controller, and thereby identify the malicious applications or infected devices.

Malicious applications that call out on a periodic basis can be detected in near real-time (on-the-fly) as malicious by tracking the beacon signals outbound from the network. The inter-packet timing is observed for each transmission from each device in the network. However, in a large network maintaining a log of all traffic may run into storage constraints and multiple devices may include communications from multiple applications to the same destination. Instead, each device is tasked with monitoring its own outbound traffic to differentiate processes, and historic data points for communications from a given processes are incorporated into a single periodicity measure, rather than storing each timestamp/destination pair in a log, thus reducing storage requirements.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
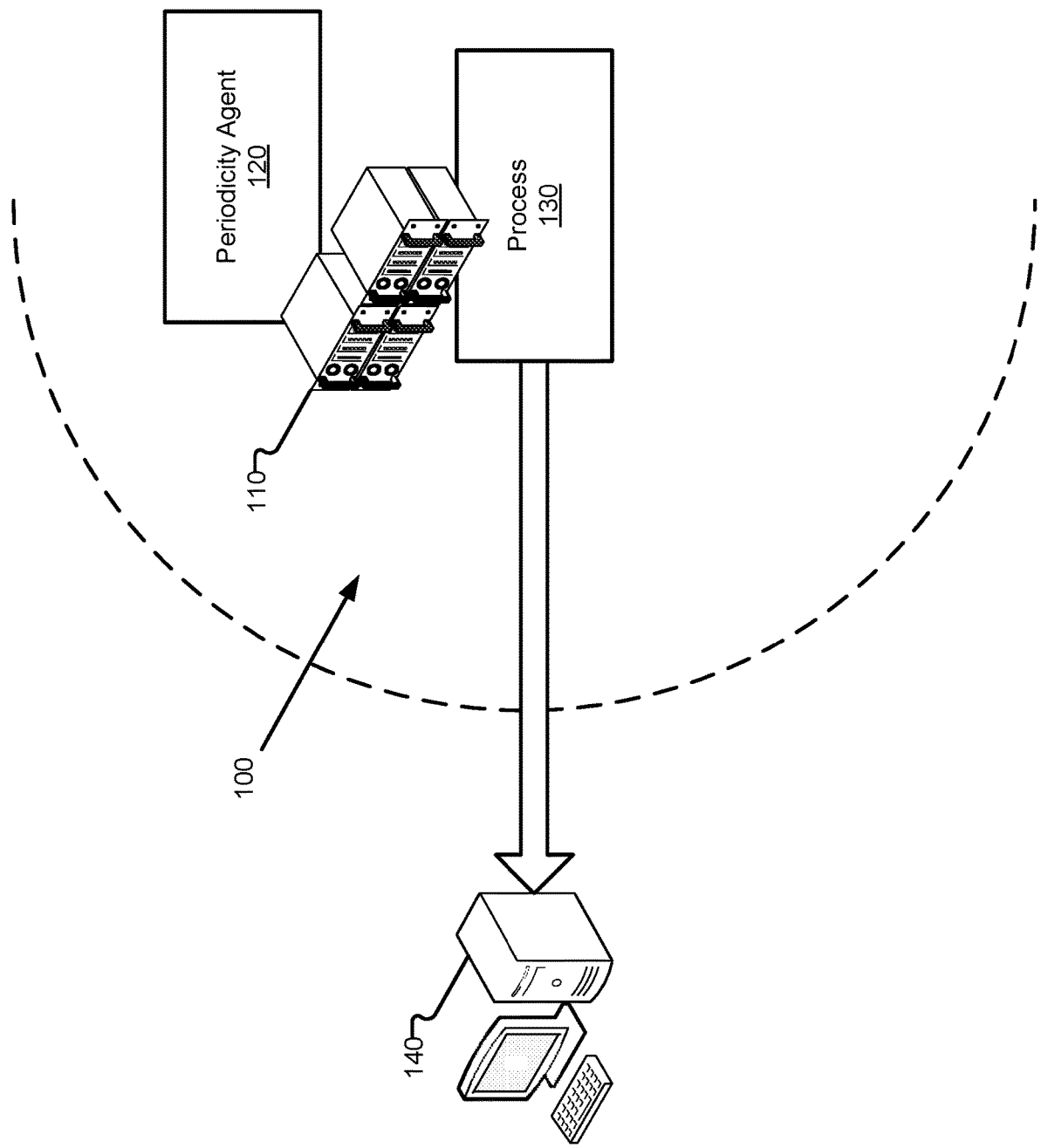
FIG. 1 illustrates an example network environment in which the systems and methods of the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

To detect malicious applications (also referred to as malware or malicious programs) or infected computing devices with the reduced use of processing resources and storage space and improved accuracy, systems and methods for periodicity detection of network traffic to identify suspicious communications are provided herein. Each server in a network environment maintains a periodicity object for the pairings of processes and destinations outside of the network environment that the server has been in communication with, and maintains a running calculation on the periodicity of communications from the given process to the given destination.

Periodicity, as discussed herein, is a measure of the time intervals between two communications. The periodicity object holds the timestamp from the last communication and running variance calculations (including average and standard deviation) for time between communications. When a new communication is transmitted, the associated periodicity object has its running variances updated and the new communication's timestamp replaces the last communication's timestamp held by the periodicity object. Because malicious applications are known to use periodic communications, once the standard deviation between successive communications maintained by the running variance calculations drops below a threshold, various security systems may use the periodicity objects to quarantine the device hosting the malicious application or the malicious application itself.

FIG. 1 illustrates an example network environment 100 in which the systems and methods of the present disclosure may be practiced. As illustrated, a server 110, which may be one of a plurality of servers in the example network environment 100, is running a periodicity agent 120 and a process 130, which may be one of a plurality of processes running on the server 110. In various aspects, each server 110 in the example network environment 100 individually runs a periodicity agent 120 and its own processes 130, but some servers 110 not running a periodicity agent 120 may also be part of the example network environment 100. The process 130 may be any application or program running on the server 110, and may direct communications to destinations within the example network environment 100 (e.g., another server 110, a gateway, a domain controller) or to a destination outside of the example network environment 100, as is illustrated by the remote device 140.

The server 110 and remote device 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4, 5A, and 5B.

Servers 110 and remote devices 140 are operated by users, who may be humans or automated systems (e.g., "bots") that run applications and programs (such as periodicity agent 120 and process 130) that perform various actions on those devices and may initiate communication between devices. For example, an instance of the SIRI®, GOOGLE NOW™ or CORTANA® electronic assistant (available from Apple, Inc. of Cupertino, Calif.; Alphabet, Inc. of Mountain View, Calif.; and Microsoft, Corp. of Redmond, Wash., respectively) may request a connection to a database in response to or in anticipation of queries from a human user.

As will be appreciated, communications initiated by a process 130 in an example network environment 100 may be formatted as a transport layer communication protocol, such as, for example, according to the Transmission Control Protocol (TCP), the User Datagram Protocol (UDP), the Stream Control Transmission Protocol (SCTP), etc. Transport layer protocols allow a process 130 to break data into transmittable pieces (generally referred to herein as "packets") for receipt by a destination machine and/or processes. The transport layer datagram is encapsulated with an Internet Protocol (IP) structure for transmission over an IP network. To ensure delivery to the destination, the IP structure specifies an IP address for the destination machine, while the transport-layer protocol specifies a port number on the destination machine with which the communication is established (IP addresses and port numbers are also included for the source machine). As will be appreciated, several intermediary or routing devices (e.g., gateways) may lie between the source machine and the destination machine of the example that are not illustrated in FIG. 1.

The process 130, however, may be either desired or undesired; a server 110 may execute a process 130 (e.g., malware) that the server 110 is unaware of as being malicious. To identify the process 130 as potentially malicious, the periodicity agent 120 registers each process 130 and the destinations to which the process connects outside of the example network environment 100 in a periodicity object. Each tuple of process identifier and destination address (e.g., IP address, IP address and port number) is associated with a unique periodicity object on each server 110, which is maintained and updated by the periodicity agent 120 in real-time, that is as the communications are established and made between the server 110 and the remote device 140, to determine whether the processes 130 running on a given server 110 are potentially malicious.

Each periodicity object is stored in a data structure, such as, for example, a dictionary data structure that is part of the periodicity agent 120 for at least as long as the connection remains open between the process 130 and the remote device 140. In some aspects, when a connection times out or is manually closed, the periodicity object is removed from the data structure, while in other aspects, the periodicity object may be maintained for a set period of time (e.g., one day, one week, one month, etc.) so long as the process 130 remains active on the server (or is assigned a static process identifier). As will be appreciated, the process identifier is a unique number assigned to a process 130 hosted by the server 110, while that process 130 is active. In various aspects, when a process 130 is no longer active, any associated periodicity objects may be deleted from the data structure so that the server 110 may reassign a given process identifier to a different process 130.

When a pairing of process identifier and destination address is associated with an existing periodicity object in the data structure, the periodicity agent 120 will update the periodicity object when a new, distinct communication is generated by the process 130. When a periodicity object is not present in the data structure, the periodicity agent 120 will create a new periodicity object for the given identifier tuple.

Each periodicity object is associated with a tuple comprising an identifier for the process 130 and one or more identifiers of an IP address and a port number for the remote device 140. A user may locate a given periodicity object with the entire tuple and may locate related periodicity objects by using portions of the tuple. For example, a user may look up all the periodicity objects associated with a given process 130 by the process identifier, or may use given IP address, a given port number, or a given IP address/port number pair to look up periodicity objects associated with those IP addresses and/or port numbers. In another example, when a user suspects a given process 130 of connection one of a plurality of remote devices 140 as backup or redundant command centers for receiving malware instructions, the user may look up all of the periodicity objects including a given process identifier (or all periodicity objects including a given process identifier and port number) and may compare the data held in each or amalgamate their data for further grouped comparison.

The periodicity objects store, in addition to their identifiers, the last time a packet was sent by the process 130 to the given remote device 140, a running average of the time interval between communications, and the running standard deviation between communications. In various aspects, the periodicity object may also store a domain name for the remote device 140, additional process identifiers (e.g., parent/child process identifiers), a filepath for the executable file of the process 130 on the server 110, a time when the communication connection was established, a number of communications seen since establishment, etc.

Figure 2:
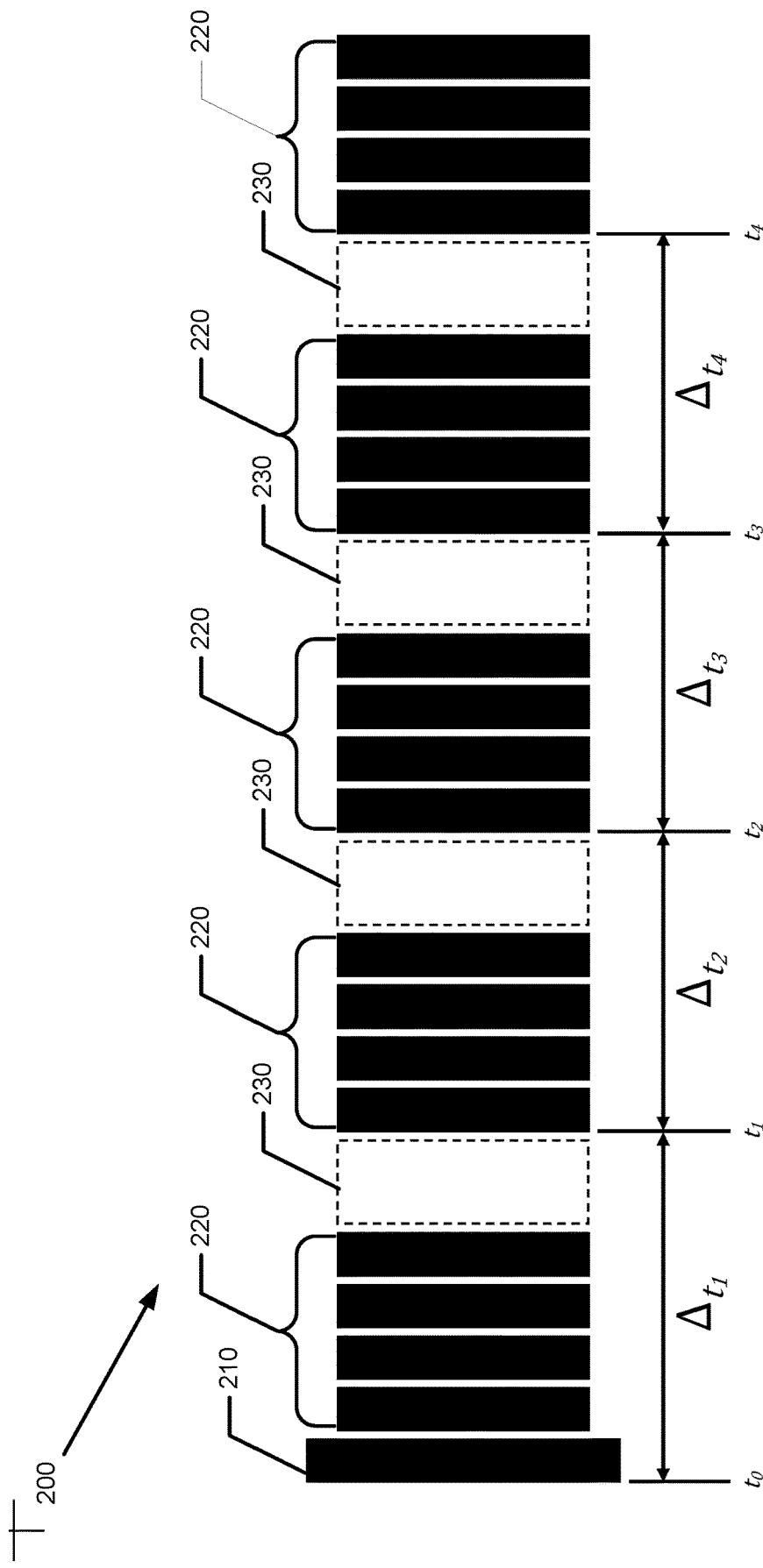
FIG. 2 illustrates a communication history according to a timeline.

Referring now to FIG. 2, a communication history 200 is illustrated in relation to how the periodicity agent 120 maintains and updates the periodicity objects. The communication history 200 for a single periodicity object is shown in FIG. 2 along a timeline, with a connection establishment event 210 (e.g., a communications handshake between the server 110 and the remote device 140) at an initial time ($t_0$), several communication packets 220 being transmitted between each time range of $t_{0-1}$ ($\Delta t_1$), $t_{1-2}$ ($\Delta t_2$), $t_{2-3}$ ($\Delta t_3$), and $t_{3-4}$ ($\Delta t_4$). As will be appreciated, the number and distribution of communication packets 220 within a given time range ($\Delta t$) may vary from what is illustrated in FIG. 2, and communication packets 220 from another process 130 and/or to another remote device 140 may be present between the illustrated communication packets 220 or within the inter-communication gaps 230.

Separating the first communication packet 220 of each time range from the last communication packet 220 of the prior time range is an inter-communication gap 230. As will be appreciated, electronic communications can be broken into multiple packets when the object to transmit exceeds the upper limit of the size for the communication protocol used or is an ongoing stream of data, and each packet is transmitted at a separate time. The time gaps between individual communication packets 220 for a single communication that has been split into pieces for transmission are relatively small compared to the inter-communication gap 230, which is at least as long as a defined minimal duration of time between communication packets 220 for a given periodicity object that are considered separate communications rather than continuations of a single communication.

The inter-communication gaps 230 represent times in which a given process 130 does not communicate to a given remote device 140. It will be appreciated, however, that during the time represented by an inter-communication gap 230, the server no may generate other outbound communications from other processes 130 and/or to other remote devices 140. The inter-communication gaps 230 between several time ranges are expected to vary in duration, as are the time ranges themselves. The periodicity agent 120 measures the variance between the end and start times of subsequent messages (or the start and start times) and keeps a running average of the duration of inter-communication gaps 230 (or time ranges), and the standard deviation thereof, to identify processes as suspicious of using beacon signals to request instructions from a remote device 140 acting as a malware command center.

Figure 3:
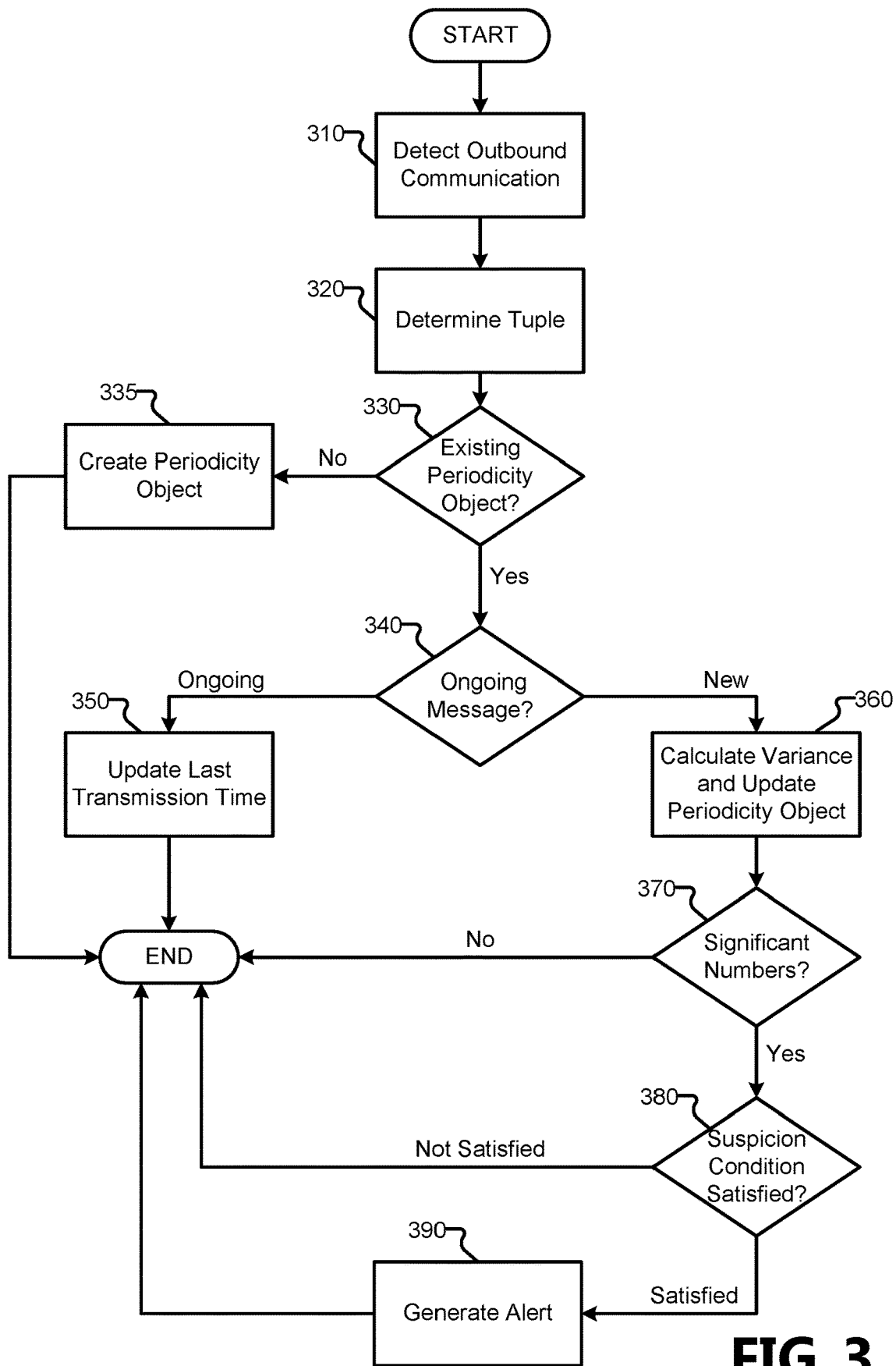
FIG. 3 is a flow chart showing general stages involved in an example method for detecting potentially malicious activity via periodicity objects.

FIG. 3 is a flow chart showing general stages involved in an example method 300 for detecting potentially malicious activity via periodicity objects. Method 300 begins at OPERATION 310, when a periodicity agent 120 installed on a server 110 detects an outbound communication from a process 130 running on that server 110. Using the process identifier for the process 130 that generated the outbound communication and addressing information in the outbound communication (e.g., an IP address/port number from a TCP/IP packet), the tuple of process identifier and external address for the remote device 140 (which may include or exclude a port number) are determined by the periodicity agent 120 at OPERATION 320. Communications for which a send event is detected, but use an IP address for a destination within the example network environment 100, or for which a communication establishing handshake (e.g., a TCP connect) has not been observed may be ignored.

The periodicity agent 120 queries the dictionary (or other data structure) with the tuple at DECISION 330 to determine whether an existing periodicity object is stored for the combination of process 130 and remote device 140. In response to determining that the periodicity object already exists, method 300 proceeds to DECISION 340. In response to determining that the periodicity object does not already exist, method 300 proceeds to OPERATION 335.

At OPERATION 335, the periodicity object is created in the dictionary (or other data structure) as a new periodicity object for the given tuple. As will be appreciated, when a periodicity object is newly created, there is only one data point for the time of transmissions, and the initial communication's time duration is unknown; it may still be ongoing. Therefore method 300 may conclude, but when a subsequent packet is detected using the tuple of the newly created periodicity object, method 300 may begin again and proceed through DECISION 330 to DECISION 340 to use the newly created periodicity object from OPERATION 335 as an existing periodicity object.

At DECISION 340 it is determined whether the outbound communication detected at OPERATION 310 is part of an ongoing message or part of a new message; whether the current and previous outbound communication comprise two of a series of packets for a first communication or a last packet of a prior communication and an initial packet of a new communication. The time at which the outbound communication was detected at OPERATION 310 is compared to the time for the previous communication for the given source/destination pair in the periodicity object to determine whether the time difference exceeds a minimal time definition for a time gap between distinct communications. For example, if the minimal time definition were set to X µs, any outbound transmission detected within X µs of the previous transmission to the same remote device 140 from the same process 130 would be considered the next part of a single message (i.e., the most recent packet of an ongoing communication rather than an initial packet of a new communication).

When the difference in observation times falls below the minimal time definition, the periodicity agent 120 classifies the outbound communication at DECISION 340 as part of an ongoing message, and method 300 proceeds to OPERATION 350. When the difference in observation times exceeds the minimal time definition, the periodicity agent 120 classifies the outbound communication at DECISION 340 as part of a new message, and method 300 proceeds to OPERATION 360.

At OPERATION 350 the last transmission time maintained in the periodicity object is updated to reflect the time that the outbound communication detected in OPERATION 310 was detected. In various aspects, the periodicity object may maintain the last transmission time or both the last transmission time and the message origination time for the ongoing message. Method 300 may then conclude.

When method 300 proceeds from DECISION 340 to OPERATION 360, the periodicity agent 120 calculates a variance between the last message and the current message, updates the running values for average and standard deviation maintained in the periodicity object, and increments a message count value. In various aspects, the variance may measure the "quiet time" between messages for a given tuple (i.e., the inter-communication gap 230), or may measure the time range for the previous message (including or excluding the associated inter-communication gap 230) for the tuple depending on how many and which observation times are stored in the periodicity object. For example, in aspects where the periodicity object maintains both the last transmission time and the prior message's origination time, the time range or the duration of the inter-communication gap 230 may be calculated for use as the variance. In another example, where the periodicity object only maintains the last transmission time, the inter-communication gap 230 will be calculated for use as the variance.

In one aspect, a periodicity object comprises the identifiers for the tuple, a last time a communication was detected for that tuple, a number of messages observed for that tuple, an average time for the inter-communication gap 230 and a standard deviation for the inter-communication gap 230. Calculating the variance therefore includes updating the average time, updating the standard deviation, and replacing the last transmission time maintained in the periodicity object with the time that the outbound communication detected in OPERATION 310 was detected.

In another aspect, the periodicity object comprises the identifiers for the tuple, a last time a communication was detected for that tuple, a time that the last message originated, a number of messages observed for that tuple, an average time for the time range and a standard deviation for the time range. Calculating the variance therefore includes updating the average time, updating the standard deviation, and replacing the last transmission time and the time for when the last message originated with the time that the outbound communication detected in OPERATION 310 was detected.

The periodicity object maintains the average and standard deviation as running calculations; not needing to maintain a large database of communication timestamps. In various aspects, the periodicity agent 120 may use a cumulative, weighted, or exponential moving average to add the newly calculated variance to the running average and standard deviation values maintained in the periodicity object. The number of observations made may be used in weighted implementations to adjust the weight applied to the variance when calculating the moving average.

In one aspect, the periodicity agent 120 uses the formula set forth as FORMULA 1 to calculate the new value for the moving average, where the weight ($\alpha$) is equal to the message count and the time of the current outbound communication ($time_{New}$) is compared against either the last outbound communication's time or the time that the last message originated ($time_{Old}$). One of ordinary skill in the art will appreciate that other formulae for calculating a moving average are possible and that FORMULA 1 is given as a non-limiting example.

$$Average_{New} = [(time_{New} - time_{Old}) + (\alpha - 1) \cdot Average_{Old}] \cdot (1/\alpha) \quad \text{FORMULA 1}$$

Similarly, the periodicity agent 120 of one aspect uses the formula set forth as FORMULA 2 to calculate the running standard deviation ($\sigma$) for the tuple, where the weight ($\alpha$) is equal to the message count and the time of the current outbound communication ($time_{New}$) is compared against either the last outbound communication's time or the time that the last message originated ($time_{Old}$). One of ordinary skill in the art will appreciate that other formulae (including using $Average_{New}$ in place of $Average_{Old}$) for calculating a running standard deviation are possible and that FORMULA 2 is given as a non-limiting example.

$$\sigma_{New} = \{[(time_{New} - time_{Old}) - Average_{old}]^2 + (\alpha - 1) \cdot \sigma_{Old}\}(1/\alpha) \quad \text{FORMULA 2}$$

The new average and standard deviation calculated in OPERATION 360 replace the old average and standard deviation maintained in the periodicity object. Additionally, in some aspects, the value of the count for the number of messages observed for the tuple (not the individual packets or parts of messages) is incremented. In other aspects, the count value for the number of messages may be incremented up to an upper count limit (e.g., 10, 15, 100, 127, 1000) and remain at that upper count limit so long as the periodicity object is maintained in the dictionary (or other data structure).

Method 300 proceeds from OPERATION 360 to DECISION 370, where it is determined whether a significant number of messages have been observed for the periodicity agent 120 to compare the standard deviation to suspicion thresholds. When the number of messages is not considered significant (i.e., there were fewer messages observed to date than required), method 300 may conclude. When the number of messages is considered significant (i.e., there have been at least as many messages observed as required), method 300 proceeds to DECISION 380. In various aspects, the number of messages to observe to be considered significant may be the upper count limit or another value set within the periodicity agent 120 to ensure that the running values maintained in the periodicity object for average and standard deviation are statistically significant representations of the periodicity of the communications between the process 130 and the remote device 140.

At DECISION 380 it is determined whether the standard deviation maintained by the periodicity object satisfies suspicion conditions set by a network administrator. In various aspects, a suspicion condition is satisfied by meeting periodicity thresholds and clearing any filters for known good process/destination tuples established by an administrator for placing suspicion on the process 130 for using a periodic beacon signal to communicate with a remote device 140 acting as a malware control center. As a beacon signal is known to repeat its outbound communications on a regular basis, a standard deviation for a tuple that falls below a first periodicity threshold may be considered to be using a beacon signal. For example, a periodicity threshold of one second would trigger when the standard deviation is less than one second.

As will be appreciated, a second periodicity threshold (e.g., a sanity threshold) may also be applied as a check to prevent false positives for standard deviations that fall below the first periodicity threshold. For example, a second periodicity threshold of 100 ms would be triggered to prevent the suspicion condition to be satisfied when the standard deviation is less than less than 100 ms.

In another aspect, a filter may be used to exempt known-safe processes 130 or process/destination tuples from otherwise satisfying the suspicion condition. For example, a known-safe filter may be applied by the periodicity agent 120 for a virus protection program that uses a beacon to communicate with an update server to prevent that periodicity object from satisfying the suspicion condition. In various aspects, filters may be implemented at DECISION 380 or at OPERATION 320, where such a filter may cause the communication for a known-safe process 130 or tuple to be ignored (and thereby cause method 300 to end before creating a periodicity object for that process 130 or tuple).

In response to the determining at DECISION 380 that the suspicion condition has been satisfied, method 300 proceeds to OPERATION 390, where an alert is generated. The alert may be generated for consumption by another process 130 on the server 110, another server 110 within the network 100, or a remote device 140. For example, the alert may cause the server 110 to terminate the suspicious process 130, to quarantine that process 130, or to initiate a virus scanner application. In other examples, the alert may signal a network security device to quarantine the server 110 that the suspicious process 130 runs on, or for a notice to be transmitted to a network administrator's remote device 140 (e.g., a cellphone, pager, an email account). In yet another aspect, the alert may be shared with other servers 110 within the network that run the same process 130 to terminate and/or quarantine that process 130 or run a virus scanner. Method 300 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
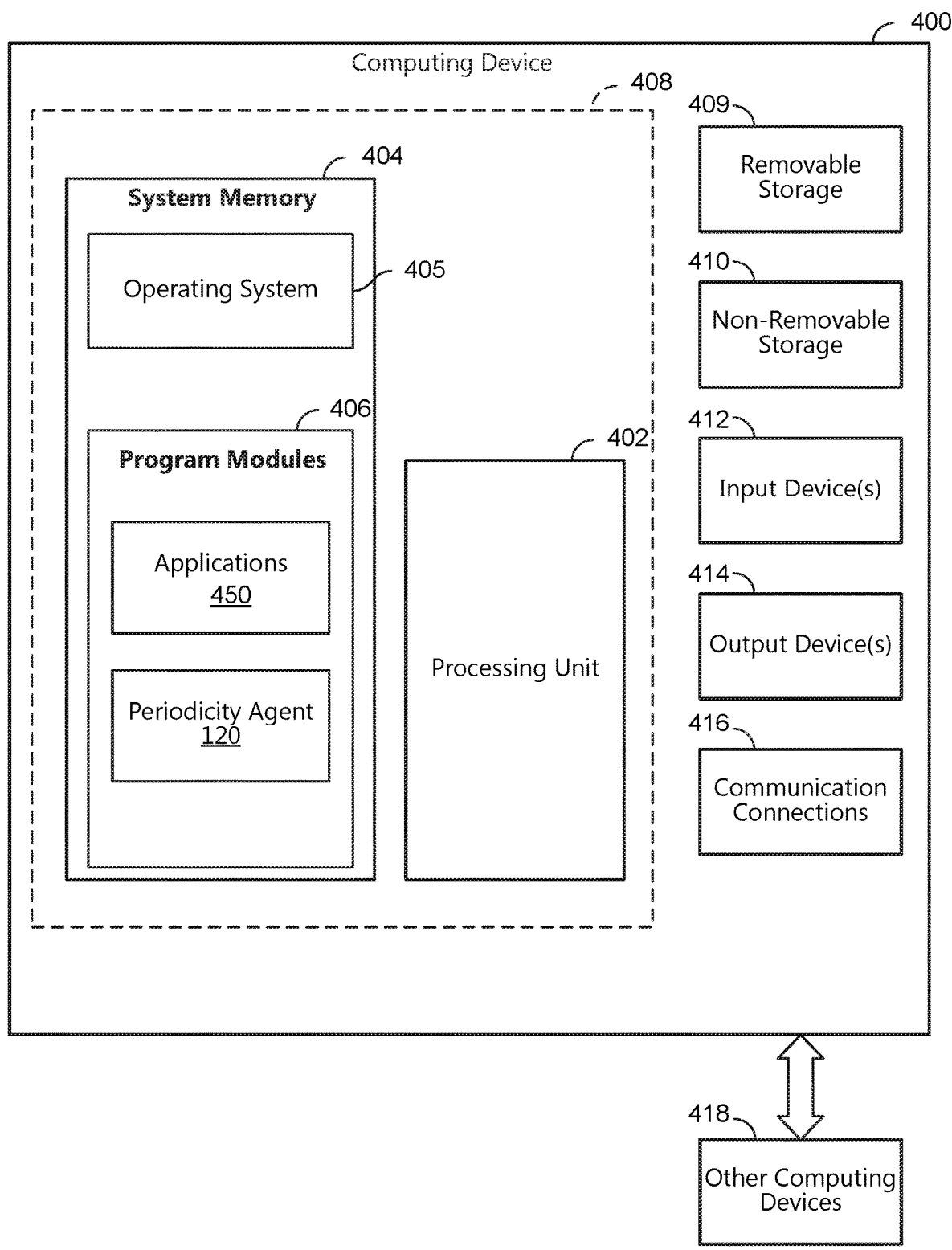
FIG. 4 is a block diagram illustrating example physical components of a computing device.

FIGS. 4-5 and the associated descriptions provide a discussion of a variety of operating environments in which examples are practiced. However, the devices and systems illustrated and discussed with respect to FIGS. 4-5 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the periodicity agent 120. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., periodicity agent 120) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

Figure 5A:
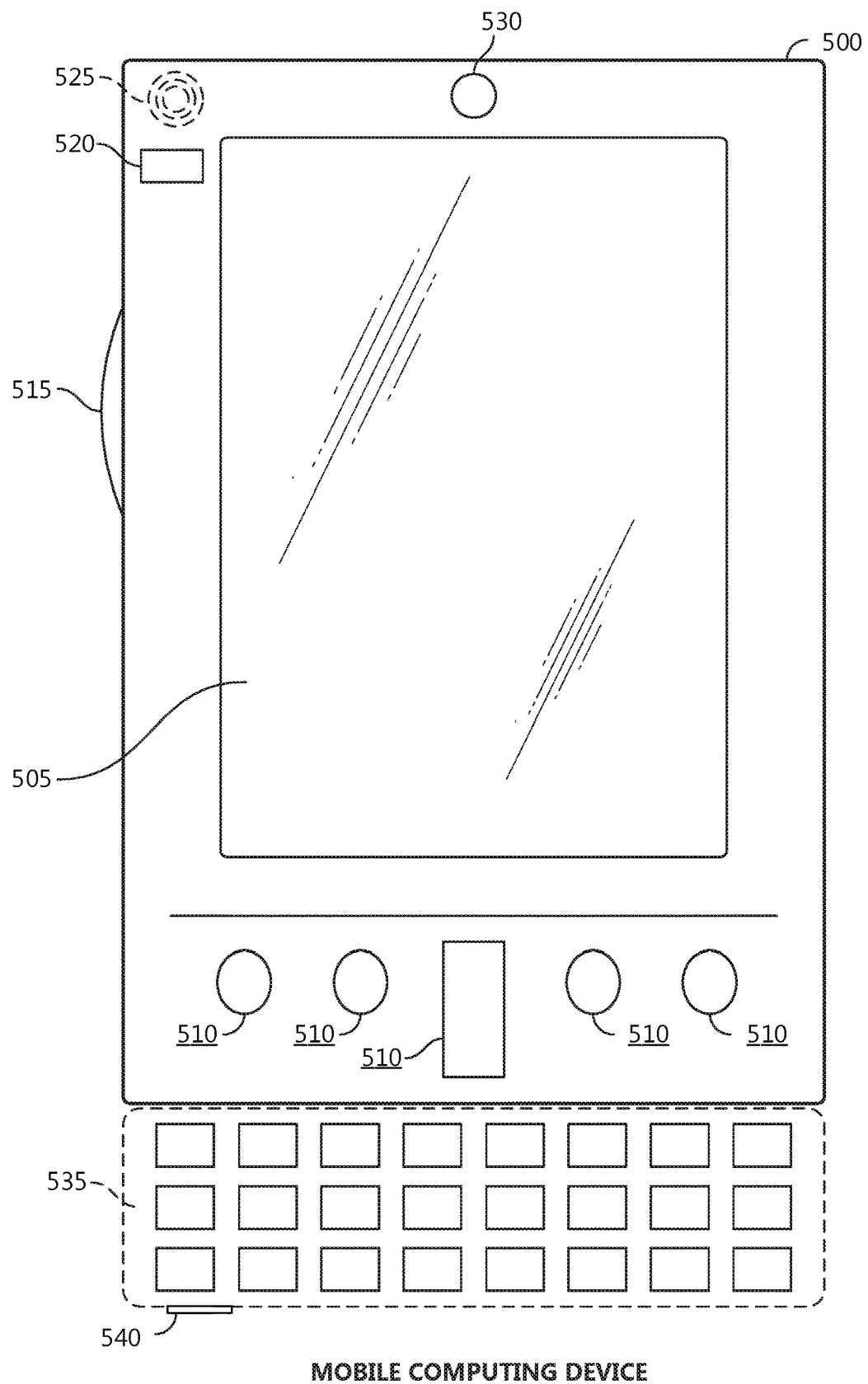
FIGS. 5A and 5B are block diagrams of a mobile computing device.
Figure 5B:
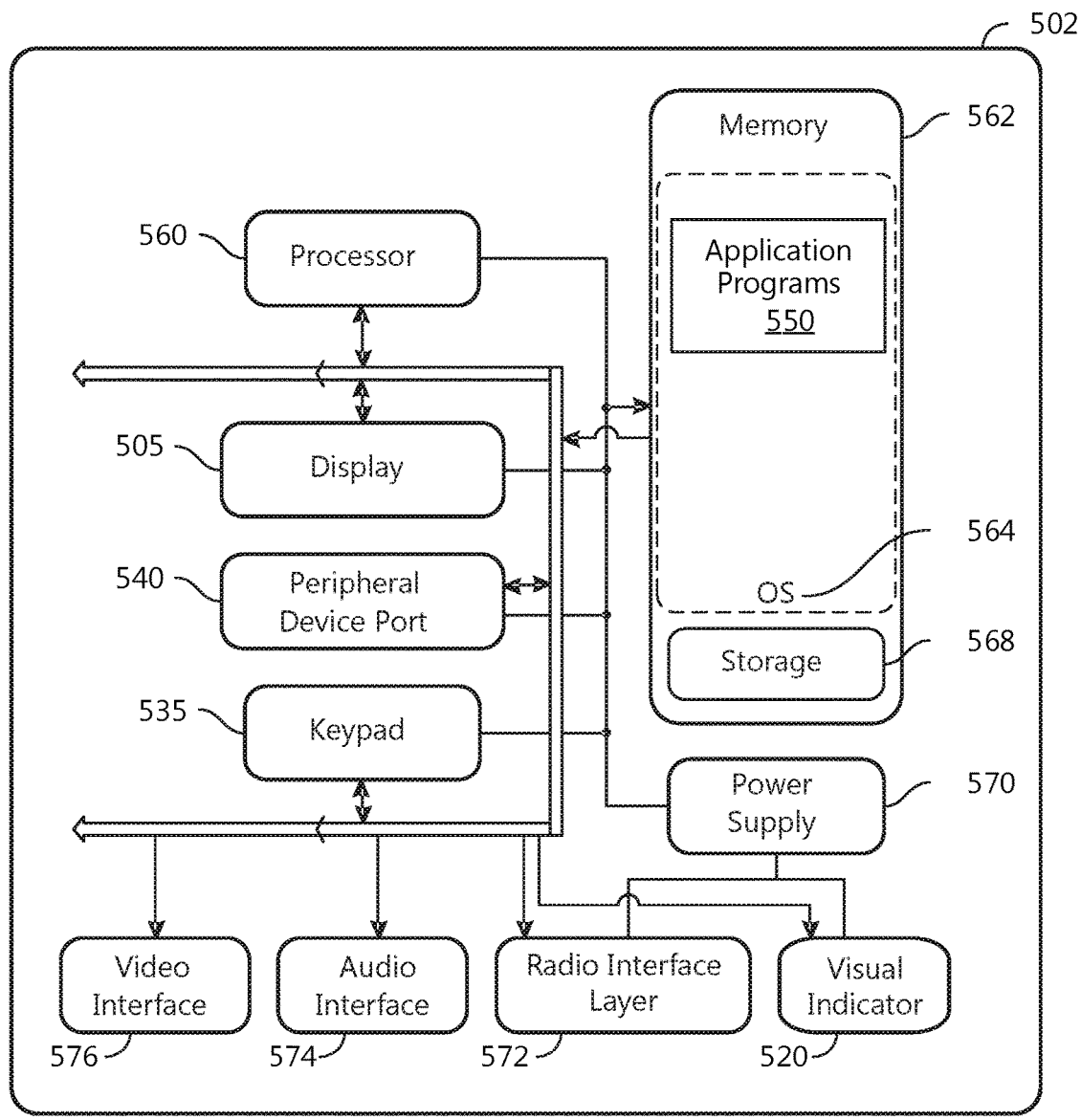

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for quarantining potential malware in a network environment by a periodicity agent, comprising:
   establishing a periodicity object associated with a process on a server in a network environment;
   registering the process in the periodicity object by storing an identifier of the process and an address of
      a remote device to which the process is operatively connected external to the network environment;
   updating in real-time:
      the identifier associated with the process, and
      the address of the remote device;
   upon generation of an outbound current communication message from the process, updating the periodicity object in real-time;
   storing in the periodicity object:
      a last sent time of a packet by the process,
      a running average time interval between successive communication messages from the process, and
      a running standard deviation of time intervals between successive communication messages from the process; and
   in response to determining that the outbound current message is not part of an ongoing message:
      calculating a time variance between:
         an end time of a last message, and
         a start time of the outbound current message, the time variance comprising a time interval between the last message and the outbound current message;
      updating:
         the running average time interval between successive communication messages, and
         the running standard deviation of the time intervals between successive communication messages; and
      in response to determining that the updated running standard deviation satisfies a suspicion condition:
         generating an alert; and
         causing the server to automatically initiate a quarantine action.

2. The method of claim 1, comprising the periodicity object being associated with a tuple comprising an identifier associated with the process, the Internet Protocol (IP) address of the connected remote device, and a port number of the connected remote device.

3. The method of claim 1, further comprising:
   measuring the time variance between respective end and start times of successive communication messages from the process;
   maintaining the running average time interval between the end and start times; and
   maintaining the running standard deviation of the time intervals.

4. The method of claim 1, comprising the outbound current message being one of an ongoing message or part of a new message.

5. The method of claim 4, further comprising:
   storing a first time when a first outbound communication to a given source/destination pair has ended;
   storing a second time when a second outbound communication to the given source/destination pair has started, the second time occurring after the first time and representing the next time an outbound communication to the given source/destination pair starts;
   comparing the stored first time to the stored second time; and
   determining that the second outbound communication is part of the new message when the difference between the stored first time and the stored second time exceeds a minimal time definition.

6. The method of claim 4, further comprising:
   measuring a time difference between when the outbound current message started and when a previous communication ended;
   comparing the time difference to a minimal time definition; and
   in response to the time difference being less than the minimal time definition, determining that the outbound current message is part of an ongoing message.

7. The method of claim 1, further comprising, in response to determining that the updated running standard deviation satisfies the suspicion condition:
   comparing the updated running standard deviation to a first periodicity threshold;

comparing the updated running standard deviation to a second periodicity threshold; and when the updated running standard deviation falls below the first periodicity threshold and does not fall below the second periodicity threshold, determining that the updated running standard deviation satisfies the suspicion condition.

8. The method of claim 1, further comprising, in response to an alert being generated, quarantining the server from the network environment.

9. The method of claim 1, further comprising, in response to the updated running standard deviation satisfying the suspicion condition, quarantining the process on the server.

10. The method of claim 1, comprising, in response to the process terminating on the server, the periodicity object being deleted from the server.

11. A system for detecting potential malware in a network environment, comprising:
 a server within a network environment comprising a processor and a computer memory storage device operable to provide a periodicity agent on the server, the periodicity agent being operable to:
  establish a periodicity object associated with a process on the server;
  register the process in the periodicity object by storing an identifier of the process and an address of
   a remote device to which the process is operatively connected external to the network environment;
  update in real-time:
   the identifier associated with the process, and
   the address of the remote device;
  upon generation of an outbound current communication message from the process, update the periodicity object in real-time;
  store in the periodicity object:
   a last sent time of a packet by the process,
   a running average time interval between successive communication messages from the process, and
   a running standard deviation of time intervals between successive communication messages from the process; and
  in response to determining that the outbound current message is not part of an ongoing message:
   calculate a time variance between:
    an end time of a last message, and
    a start time of the outbound current message, the time variance comprising a time interval between the last message and the outbound current message;
   update:
    the running average time interval between successive communication messages, and
    the running standard deviation of the time intervals between successive communication messages;
   increment a message count value; and
   in response to determining that the message count value exceeds a required minimum and that the updated running standard deviation satisfies a suspicion condition, the periodicity agent is further configured to:
    generate an alert; and
    cause the server to automatically initiate a quarantine action.

12. The system of claim 11, comprising the periodicity agent being further configured to:

measure the time variance between respective end and start times of successive communication messages from the process;

maintain the running average time interval between the end and start times; and maintain the running standard deviation of the time intervals.

13. The system of claim 11, comprising the periodicity agent being further configured to:
 store a first time when a first outbound communication to a given source/destination pair has ended;
 store a second time when a second outbound communication to the given source/destination pair has started, the second time occurring after the first time and representing the next time an outbound communication to the given source/destination pair starts;
 compare the stored first time to the stored second time; and
 determine that the second outbound communication is part of a new message when the difference between the stored first time and the stored second time exceeds a minimal time definition.

14. The system of claim 11, comprising the periodicity agent being further configured to initiate a virus scan process of the server when the updated running standard deviation satisfies the suspicion condition.

15. The system of claim 11, further comprising, in response to determining that the updated running standard deviation satisfies the suspicion condition, quarantine the process on the server.

16. A nonvolatile computer-readable storage device including instructions which, when executed by a processor on a server, are operable to provide a periodicity agent performing the steps of a method for detecting potential malware in a network environment, the method comprising:
 establishing a periodicity object associated with a process on a server in a network environment;
 registering the process in the periodicity object by storing an identifier of the process and an address of
  a remote device to which the process is operatively connected external to the network environment;
 updating in real-time:
  the identifier associated with the process, and
  the address of the remote device;
 upon generation of an outbound current communication message from the process, updating the periodicity object in real-time; and
 in response to determining that the current message is not part of an ongoing message:
  calculating a time variance between:
   an end time of a last message, and
   a start time of the outbound current message, the time variance comprising the time interval between the last message and the outbound current message;
  calculating a standard deviation of time intervals between successive communication messages; and
  in response to determining that the calculated standard deviation satisfies a suspicion condition:
   generating an alert; and
   causing the server to automatically initiate a quarantine action.

17. The storage device of claim 16, the method further comprising:
 storing in the periodicity object the last sent time of a process packet, a running average time interval between successive communication messages from the process, and a running standard deviation of the time intervals between successive communication messages.

18. The storage device of claim 17, the method further comprising:
measuring the time variance between respective end and start times of successive communication messages from the process;
maintaining the running average time interval between the end and start times; and
maintaining the running standard deviation of the time intervals.

19. The storage device of claim 16, the method further comprising:
storing a first time when a first outbound communication to a given source/destination pair has ended;
storing a second time when a second outbound communication to the given source/destination pair has started, the second time occurring after the first time and representing the next time an outbound communication to the given source/destination pair starts;
comparing the stored first time to the stored second time; and
determining that the second outbound communication is part of a new message when the difference between the stored first time and the stored second time exceeds a minimal time definition.

20. The storage device of claim 16, the method further comprising, in response to determining that the calculated standard deviation satisfies the suspicion condition, quarantining the process on the server.

* * * * *